Sept. 14, 1937.   A. H. LAMB   2,093,361
SENSITIVE CONTROL CIRCUIT
Filed Sept. 7, 1935

Inventor:
Anthony H. Lamb,
By Potter, Pierce & Scheffler,
Attorneys.

Patented Sept. 14, 1937

2,093,361

UNITED STATES PATENT OFFICE 2,093,361

SENSITIVE CONTROL CIRCUIT

Anthony H. Lamb, Elizabeth, N. J., assignor to Weston Electrical Instrument Corporation, Newark, N. J., a corporation of New Jersey Application September 7, 1935, Serial No. 39,655

7 Claims. (Cl. 219—20)

This invention relates to sensitive control circuits and more particularly to control circuits, such as used for temperature regulation, which operate on the so-called null method by balancing the voltage generated by a thermocouple against a regulated voltage drop across a resistor.

An object of the invention is to provide a sensitive control circuit including electrical elements adjustable to preset the "null" or operating point quickly, and with high accuracy, to any desired point. An object is to provide a temperature control circuit operating on the null method and including a thermocouple, an adjustable voltage source, a sensitive control relay upon which the thermocouple and voltage source impress voltages in opposition, and a simple circuit network for setting the operating point of the control circuit accurately to any desired point. A further object is to provide a temperature control circuit of the thermocouple and opposing voltage type, the circuit including a millivoltmeter and switch connections adjustable to permit a continuous reading of the thermocouple output, i. e. temperature readings, without interfering with the desired control or, alternatively, to permit an accurate setting of the null or operating point to a desired value.

These and other objects and advantages of the invention will be apparent from the following specification when taken with the accompanying drawing in which.

Figure 1:
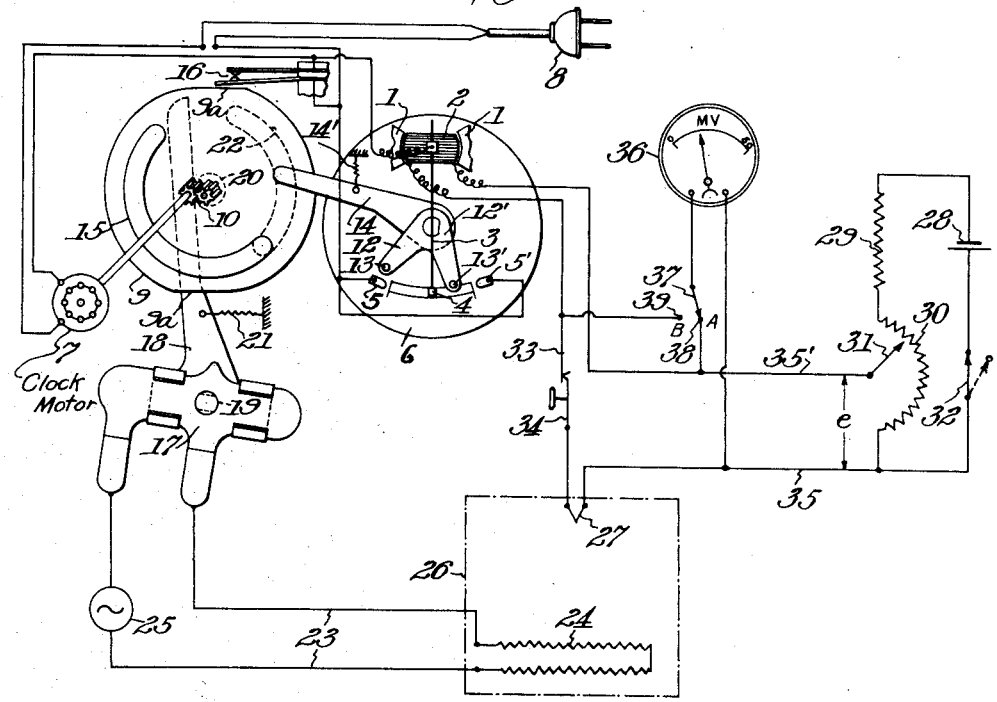
Fig. 1 is a circuit diagram of one embodiment of the invention.
Figure 2:
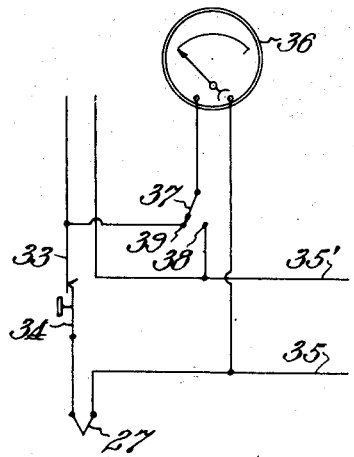
Figs. 2 and 3 are fragmentary circuit diagrams showing different adjustments of a millivoltmeter connection.
Figure 3:
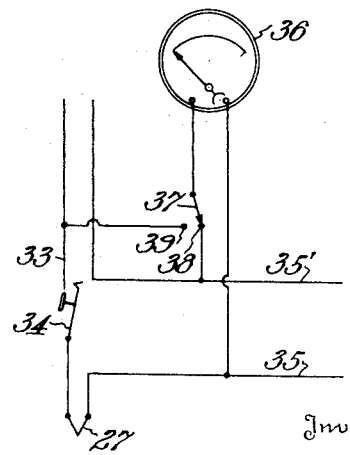

The relay elements of the control circuits may be, and preferably are, sensitive electrical measuring instruments of the type including magnetic contacts, such as are described and claimed in my copending applications Serial Numbers 688,695 and 688,696, filed Sept. 8, 1933 and Serial Number 733,132, filed June 29, 1934. Such instrument relays are particularly advantageous as contact engagements capable of carrying substantial currents may be obtained with relays of such high sensitivity as to operate upon a range of, for example, as low as ¼ millivolt to either side of the zero or null point determined by the setting of the adjustable voltage source.

As illustrated, the instrument relay includes a permanent magnet having spaced poles 1 between which the coil 2 is pivotally mounted. The coil carries a pointer 3 having a rider or contact 4 of magnetic material which is movable between the spaced contacts 5, 5' that take the form of small permanent magnets. The contacts 5, 5' are connected by a jumper 6, and the relay contacts constitute a switch in a circuit which includes a small synchronous motor 7, such as used in electric clocks, and an alternating current source, the latter being indicated by the typical connection plug 8.

A cam disk 9 is rotated by the motor through a reduction gearing, indicated by gears 10, and serves to separate the instrument contacts and to actuate a switch in a control or signal circuit. The torque developed by current flow in coil 2 is not sufficient to overcome the magnetic attraction of the contacts and, for separating the contacts, a yoke 12, 12' is pivoted on the base of the instrument and has pusher rods 13, 13' arranged at opposite sides of the contact arm or pointer 3. The yoke is rocked by an arm 14 which lies in the path of a semi-circular cam projection 15 on the cam disk 9, the arm 14 being yieldingly retained in the illustrated position by a spring 14'. The cam disk has opposed flats or depressions 9a at its periphery for actuating a holding switch 16 for the motor before the cam projection 15 operates to separate the relay contacts 4, 5 or 4, 5'.

The mercury switch 17 is mounted on a lever 18 that has a pivotal mounting 19 and is normally held against a stop ring 20 on cam disk 9 by a coil spring 21. When the disk is rotated through 180° from the illustrated position, the arm 18 is engaged by a cam projection 22 and rocked in a counterclockwise direction to close the mercury switch 17. Leads 23 extend from the switch 17 to complete a series circuit including a heating resistor 24 and a current source 25. The resistor 24 is located within an oven, furnace or other compartment 26 that is to be retained at a predetermined temperature.

In accordance with this invention, the control circuit of the moving coil 2 of the instrument relay includes, in series opposed relation, a thermocouple 27 and a source of adjustable voltage e. The voltage source is a series circuit including a battery 28, a fixed resistor 29 and a voltage divider 30 having a slider 31. The circuit preferably includes a switch 32 but the current drain is so low that, if desired, the switch may be omitted. One lead 33 from the thermocouple to coil 2 includes a push button switch 34, and the other lead 35 extends from the thermocouple to a terminal of the voltage divider, the series circuit being completed to coil 2 by the lead 35' from the slider 31. A sensitive millivoltmeter 36 is connected between lead 35 and a switch arm 37 that may be adjusted to contact point 38 connected to lead 35′, or to contact point 39 connected to lead 33.

The null point of the control circuit may be set at any desired temperature within the range of the thermocouple by first setting switch arm 37 to contact point 38, thus connecting the millivoltmeter directly across the voltage divider to read the voltage e. The push button switch 34 is then operated to open the thermocouple circuit and slider 31 is adjusted along resistor 30 to bring the measured voltage e to the exact value corresponding to the thermocouple output for the desired temperature. A temperature-voltage table is usually furnished with commercial thermocouples and, by subtracting the voltage output for the cold terminal temperature from the voltage output at the desired temperature, the net voltage generated by the thermocouple at the required temperature is determined. When voltage e is set at this value, the switch 34 is closed and, if desired, switch contact 37 is adjusted to contact point 39 to measure the voltage output of the thermocouple. This adjustment is frequently desirable when a cold furnace is placed in operation or when the circuit is adjusted to a different value for the temperature in the furnace 26. The operation of the control circuit is not affected but the operator can read the voltage output of the thermocouple and thus have a continuous reading of the temperature of the furnace. The operator can thus determine how quickly a cold batch heats up or, for a reduction in operating temperature, how quickly the batch cools down.

When the contacts 5, 5′ are spaced apart by a distance corresponding to that deflection of coil 2 which results from, for example, a change of ½ millivolt, the temperature may be regulated within a temperature range corresponding to plus or minus ¼ millivolt in the output of the thermocouple. The accuracy of the calibration of commercial thermocouples is guaranteed within certain limits and, for higher accuracy of control when a new thermocouple 27 is placed in use, the furnace may be brought to the desired temperature by measurement with a sensitive pyrometer. The voltage output of the thermocouple at that temperature is measured by moving switch contact 37 to contact point 39. The bucking voltage e is then adjusted to that exact value and the temperature of the furnace will then be maintained at the desired value whether or not the factory calibration of the thermocouple was accurate.

When the parts are in the positions shown in Fig. 1, the temperature of the oven or furnace 26 is at the desired point and the heating circuit is open at the mercury switch 17. The pusher rod 13′ prevents the instrument contact arm from reaching the "high" contact 5′ and the heating circuit cannot be closed until the voltage output of the thermocouple drops so far below the adjusted voltage e that the moving coil system displaces the rider 4 on a pointer 3 into the magnetic field of the magnet contact 5. The motor circuit is thus closed, and cam disk 9 is rotated clockwise through 180°. Holding switch 16 is closed before the cam 15 engages lever 14 to rock the pusher arm system to separate contacts 4, 5 and to position the pusher rod 13 to block contact 3 from the "low" contact 5. The motor is stopped by the opening of switch 16 when the other cam depression 9a moves into alinement with the switch. The mercury switch 17 is tilted into closed position during this movement of cam disk 9, i. e. the cam surface 22 rocks the upper end of lever 18 to the left. A similar half-rotation of cam disk 9 takes place to open the switch 17 when the rising oven temperature increases the thermocouple output to move contact 4 into engagement with contact 5′.

It is to be noted that the present invention avoids those errors which were introduced by changes in the battery voltage and by the customary use of a voltage divider which was calibrated in temperature graduations. Such a system of calibration was based upon assumed values of the voltage output of a "standard" thermocouple and could not correct accurately for the particular thermocouple which was used in the control circuit. Nor did the prior systems include any means for avoiding errors arising from variations in the temperature of the cold junction of the thermocouple.

The current output of battery 28 is only a few milliamperes, and the battery thus has a useful life of several months. Variations in the battery voltage do not affect the accuracy of the control as the voltage e may be set at any desired point and, by setting switch contact 37 to contact point 38, may be retained at that value irrespective of changes in the battery output voltage.

It is to be understood that the invention is applicable to control circuits in which the variable factor is not dependent upon temperature variations, and that the invention is not restricted to the illustrated embodiments as various changes in the circuit arrangement and the various elements thereof may be made without departure from the spirit of my invention as set forth in the following claims.

I claim:

1. In a control circuit, an electrical generator having the property of developing a voltage that is a function of a variable factor, an adjustable voltage source, a voltage responsive control device, an electric circuit controlled by said device and including means for varying the magnitude of said factor, circuit elements connecting said generator and said voltage source to said control device in a series circuit with said generator and voltage source in series opposing relation, and a voltage measuring instrument connected across said voltage source to measure the voltage introduced thereby into the said series circuit.

2. A control circuit as claimed in claim 1, in combination with switch means operative to connect said voltage measuring device alternatively across said voltage source and across said generator.

3. A temperature control system comprising a thermocouple, an adjustable voltage source, a control device having a stationary contact and a contact arm movable in accordance with the voltage impressed across said control device, circuit elements connecting said thermocouple and said voltage source in circuit with said control device and in series opposing relation, and a voltmeter connected across said voltage source to measure the output voltage thereof.

4. A temperature control system as claimed in claim 3, wherein one of said circuit elements is a switch located in said circuit outside of the connections of said voltmeter to said voltage source, whereby the output voltage of said source may be measured whether said switch is open or closed.

5. In a temperature control system, the combination with an electrical heating element, a current source for energizing the same, and a control means having contacts forming a switch in a circuit including said heating element and said current source, of a thermocouple subject to the temperature established by said heating element, a source of voltage and means for adjusting the effective voltage output thereof, circuit elements connecting said thermocouple and said voltage source to said control device in series opposing relation, a voltage measuring device, and means for connecting said measuring device across said voltage source to measure the voltage output thereof which opposes the thermocouple voltage.

6. A temperature control system as claimed in claim 5, wherein said connecting means includes switch means operable to connect said measuring device alternatively across said voltage source or across said thermocouple, thereby permitting the reading of thermocouple voltages indicative of the temperature of the thermocouple.

7. A temperature control system as claimed in claim 5, wherein said control means comprises a sensitive measuring instrument having magnetic contacts, and means operative independently of the voltage impressed across said control device for separating the magnetic contacts.

ANTHONY H. LAMB.